United States Patent [19]

Okamoto et al.

[11] Patent Number: 5,452,422
[45] Date of Patent: Sep. 19, 1995

[54] BUS COMPETITIVE CONTROL APPARATUS

[75] Inventors: Yasushi Okamoto; Kikuo Muramathu, both of Hyogo, Japan

[73] Assignee: Mitsubishi Denki Kabushiki Kaisha, Tokyo, Japan

[21] Appl. No.: 977,499

[22] Filed: Nov. 17, 1992

[30] Foreign Application Priority Data

Nov. 20, 1991 [JP] Japan .................... 3-331164

[51] Int. Cl.6 ............... G06F 13/368; G06F 13/376
[52] U.S. Cl. ...................... 395/293; 395/729; 395/726; 364/240.0; 364/242.6; 364/DIG. 1; 370/85.2
[58] Field of Search ............. 370/85.1, 85.3, 56, 370/85.8, 85, 95.1, 50, 85.5, 85.2, 85.6; 395/800, 425, 200, 325, 275, 775, 750, 650, 800, 325, 275, 650; 371/20.5, 29.5; 340/825.02, 825.5, 825.51

[56] References Cited

U.S. PATENT DOCUMENTS 4,411,004 10/1983 Graham .................... 375/56
5,107,456 4/1992 Schuur .................... 395/325
5,123,029 6/1992 Bantz et al. .................... 375/1

FOREIGN PATENT DOCUMENTS 0183431 11/1985 European Pat. Off. ...... G06F 15/16

OTHER PUBLICATIONS

"Serieller Geratebus mit mit fehlererkennendem Empfanger," Summ, et al., *Elektronik*, Jan. 8, 1991, Munich, Germany, pp. 56–59.
"Information Communication Protocol", Ohm, p. 213.

*Primary Examiner*—Eric Coleman
*Assistant Examiner*—Charles R. Kyle
*Attorney, Agent, or Firm*—Townsend and Townsend and Crew

[57] ABSTRACT

When a delay of communication data due to a common data circuit obstructs a collision detection between units, a transmission rate control section produces a speed setting basic clock, whose period Tm is set to be long, on the basis of the output of a sequence control section. A transmission section and a reception section comprising a demodulator are controlled on the basis of the clock so as to set the transmission speed of a collision detection field to be low, thereby reducing the influence of the delay on the communication data.

4 Claims, 10 Drawing Sheets

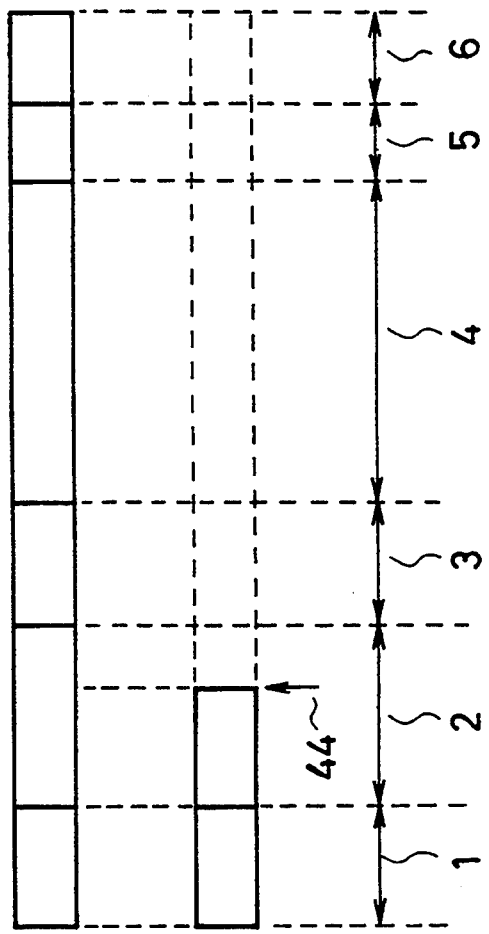

BUS COMPETITIVE CONTROL APPARATUS

BACKGROUND OF THE INVENTION

1. Field of the Invention

The present invention relates to a bus competitive control apparatus which prevents delays of data due load resistances or load capacities in performing collision detection in a bus competitive control mode (system).

2. Description of the Prior Art

A description will be made with reference to FIGS. 1, 2 and 10 in terms of a conventional bus competitive control apparatus. FIG. 1 shows one example of data communication formats predetermined between common data circuits (lines). In FIG. 1, the format is composed of a transmission start signal area 1 for transferring the transmission start to all units coupled to the common data circuits, a priority determining area 2 for determining the priority at the time of collision in the bus competitive control mode, a communication control area 3, a communication data area 4, a communication data termination area 5 and a transmission completion area 6. Further, as illustrated in FIG. 2, a communication system is constructed such that units 12a to 12d having communication control functions communicable in the aforementioned common data communication format are coupled through transmission lines 10a to 10d and reception lines 11a to 11d to a common data circuit 9. As shown in FIG. 10, each of the units 12a to 12d comprises a control section 13 and a communication control section 14, and the communication control section 14 includes a transmission section 15 for transmission control to the common data circuit 9, a reception section 16 for reception control from the common data circuit 9, and a collision detection section 17 for priority determination (collision detection) at the time of collision in the bus competitive control mode.

Secondly, a collision detection operation of the aforementioned communication system in the bus competitive control mode will be described with reference to a data transmission flow chart of FIG. 9 in addition to FIGS. 1, 2 and 10. The transmission and reception of data are effected in the predetermined common data communication format as illustrated in FIG. 1. In the communication system in which the respective units 12a to 12d are coupled through the transmission lines 10a to 10d and the reception lines 11a to 11d to the common data circuit 9 as illustrated in FIG. 2, let it be assumed that the A and B units 12a and 12b generate transmission requests. The collision detection operation in the bus competitive control mode in this case will be described hereinbelow with reference to the data transmission flow chart of FIG. 9. In FIG. 9, prior to the communication, the A unit 12a and B unit 12b generating the transmission requests (step 19) respectively performs transmission frame assembling works (step 19') in accordance with the data communication format as shown in FIG. 1. Then, the A unit 12a and B unit 12b observe the transmission and reception status on the above-mentioned common data circuit and detect, on the basis of a communication termination signal from the communication data termination area 6 on the FIG. 1 data communication format, that the transmission and reception of data are completed between the other units, thereafter advancing from the transmission frame deferring state decision (step 20) to the transmission start (step 21) state. With this operation, the transmission start phases of the A and B units 12a and 12b are combined, and a transmission start signal area 1 shown in FIG. 6 is transmitted to the common data circuit 9, then proceeding to a priority determining area 2 to perform the collision detection (step 22) in FIG. 9. Here, let it be assumed that on this communication system the A unit 12a has been set to be higher in priority than the B unit 12b. First, a description will be made in terms of the operation of the A unit 12a having the higher priority. The A unit 12a, effecting the transmission start (step 21) in FIG. 9, enters into the priority determining area 2 to perform the collision detection (step 22) in FIG. 9 and confirms that a signal having a priority higher than the priority signal itself is not generated from the other units, then transmitting the communication control area 3, communication data area 4, communication data termination area 5 and transmission completion signal area 6 in FIG. 6 to the common data circuit 9 in FIG. 2. In FIG. 9, at the time of the completion of the transmission, the operation advances from the transmission completion decision (step 26) to a transmission error detection (step 27). Here, the operation goes to an abnormal termination (step 29) in the case of detection of an error and goes to a normal termination (step 28) in the case of no detection of the error, thereby terminating the transmission.

Further, a description will be made in terms of the operation of the B unit 12b having a priority lower than that of the A unit 12a. In FIG. 9, the B unit 12b, performing the transmission start (step 21), enters into the priority determining area 2 to effect the collision detection (step 22) so as to perform the collision detection. The B unit, detecting that a signal having a priority higher than its own priority signal is generated from the other unit, performs a transmission stop process (step 23) and then increases the trial count by 1 (step 24) to check whether it exceeds the trial count limitation (step 25). In the case of not exceeding the trial count limitation, the operation again advances to the transmission deferring state decision (step 20). On the other hand, if exceeding the trial count limitation, the operation proceeds to the abnormal termination (step 29).

When each of the units shown in FIG. 2 performs the above-described operation, in the above-mentioned communication system, the collision detection in the bus competitive mode can be realized, and a series of communication data transmissions from the transmission start signal area 1 to the transmission completion signal area 6 in FIG. 6 are effected with respect to the common data circuit 9 at a fixed transmission speed to perform the data transmission and reception between the respective units.

Since the conventional bus competitive control apparatus is arranged as described above, the collision detection in the bus competitive control mode is affected by delays of the transmitted communication data due to load resistances or load capacities of the common data circuit and hence the transmission is required to be effected at a speed including a portion corresponding to the delay whereby there is a problem that difficulty is encountered to increase the transfer speed for the transmission and reception between the units.

SUMMARY OF THE INVENTION

The present invention has been developed in order to eliminate the above-described problem, and it is therefore an object of this invention to provide a bus competitive control apparatus which is capable of reducing the affection of the delay of the communication data due to the common data circuit 9 for the collision detection in the bus competitive control mode and, in addition, shortening the time period necessary for the transmission and reception between the units.

A bus competitive control apparatus according to a first embodiment of this invention is equipped with a speed setting means 34A whereby the transmission speed to the common data circuit for the above-mentioned collision detection field (priority determining area) 2 is lower by a system-allowable value than the speed for a non-collision detection field.

A bus competitive control apparatus according to a second embodiment of this invention is, for the speed setting means 34A, equipped with a speed setting basic clock 38 for setting the data speeds of the collision detection field 2 (priority determining area) and the non-collision detection field 30 in accordance with a period and a sequence control section 34 whereby the period of the clock is set to become long at every detection of the collision detection field 2 (priority determining area) so as to lower the transmission speed.

In a bus competitive control apparatus according to a third embodiment of this invention, the speed setting means 34A is equipped with a variable means 34m which can relatively vary the transmission speed of the collision detection field 2 (priority determining area) with the transmission speed of the non-collision detection field 30.

In a bus competitive control apparatus according to a fourth embodiment of this invention, each of the units is provided with a reception section 16 comprising a demodulator 16a for receiving and demodulating the data on the common data circuit 9, and the operating speed of the demodulator 16a is controlled on the basis of the output of the above-mentioned speed setting means 34A so that the speed at the reception time of the collision detection field 2 (priority determining area) is lower than the speed at the reception time of the non-collision detection field 30.

In the bus competitive control apparatus according to the first embodiment of this invention, when the next signal to be transmitted in the transmission frame is decided to be the area to be collision-detected, the speed setting means 34A sets the transmission speed to the transmission speed for the collision detection and transmits the data.

In the bus competitive control apparatus according to the second embodiment of this invention, a transmission rate control section 35 controls the clocks of the transmission section 15 and reception section 16 on the basis of a control signal 37 to be outputted from the sequence control section 34 constituting the speed setting means 34A and the speed setting basic clock 38 set in accordance with the control signal 37 so as to become long in period at every detection of the collision detection field 2, thereby respectively setting the transmission speeds of the collision detection field 2 and the non-collision detection field on the common data circuit 9.

In the bus competitive control apparatus according to the third embodiment of this invention, the period of the speed setting basic clock 38 is varied by the variable means 34m.

In the bus competitive control apparatus according to the fourth embodiment of this invention, at the reception time of the collision detection field 2, the operating speed of the demodulator 16a is controlled with the clock, set to be longer in period as compared with the reception time of the non-collision detection field 30, so as to be lower than the normal speed to accurately perform the demodulating operation.

The above and other objects, features, and advantages of the Invention will become more apparent from the following description when taken in conjunction with the accompanying drawings.

BRIEF DESCRIPTION OF THE DRAWINGS

FIG. 6 shows the concept of collision on a common data circuit in a bus competitive control apparatus according to an embodiment of this invention;

DESCRIPTION OF THE PREFERRED EMBODIMENT

Figure 1:
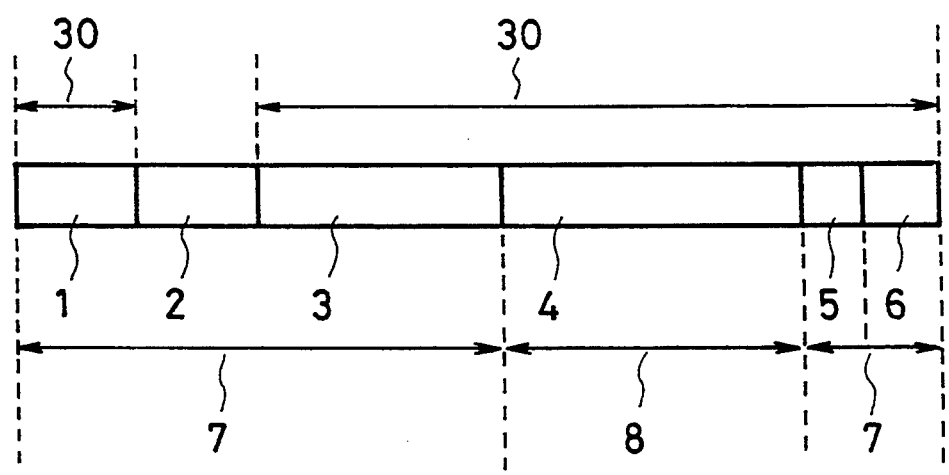
FIG. 1 is an illustration of one example of data communication formats applicable in common to a conventional bus competitive control apparatus and a bus competitive control apparatus according to the present invention.
Figure 2:
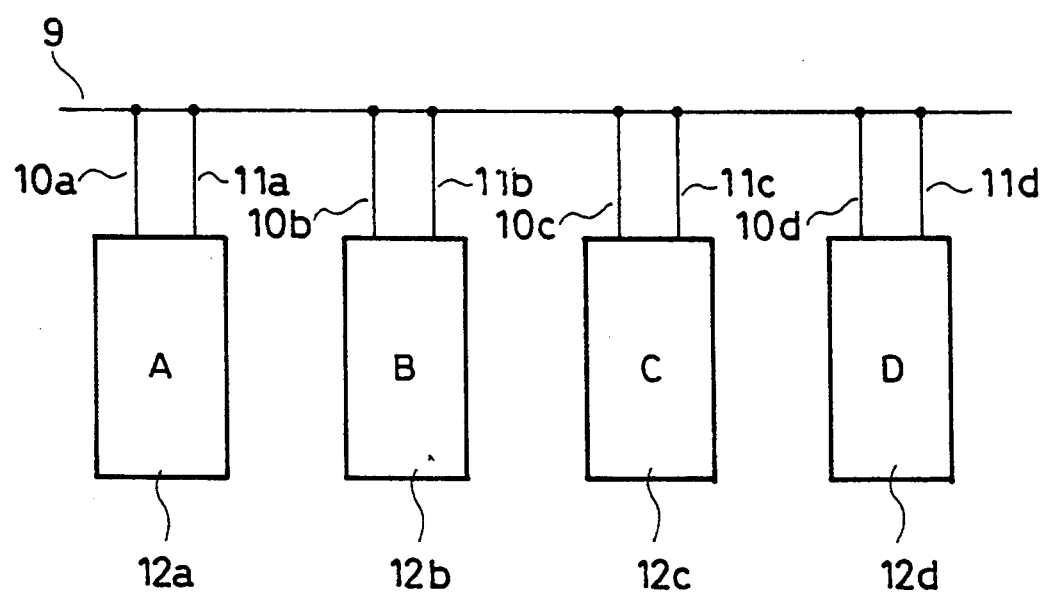
FIG. 2 is an illustration of one example of a connection between units to a common data circuit applicable in common to a conventional bus competitive control apparatus and a bus competitive control apparatus according to the present invention.
Figure 3:
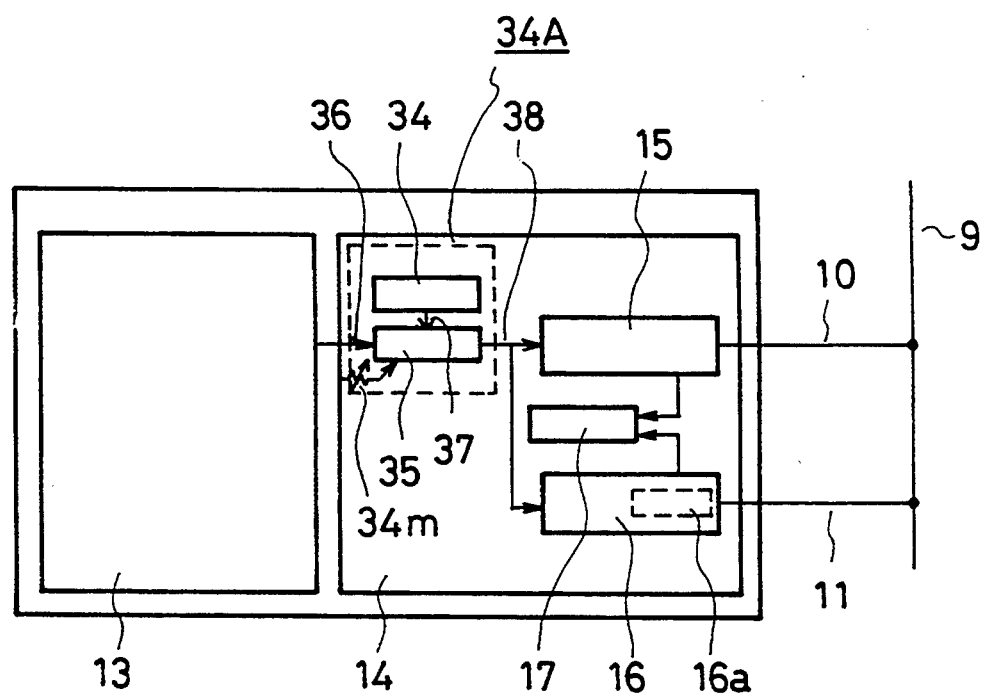
FIG. 3 is a block diagram showing a unit of a bus competitive control apparatus according to an embodiment of this invention.
Figure 10:
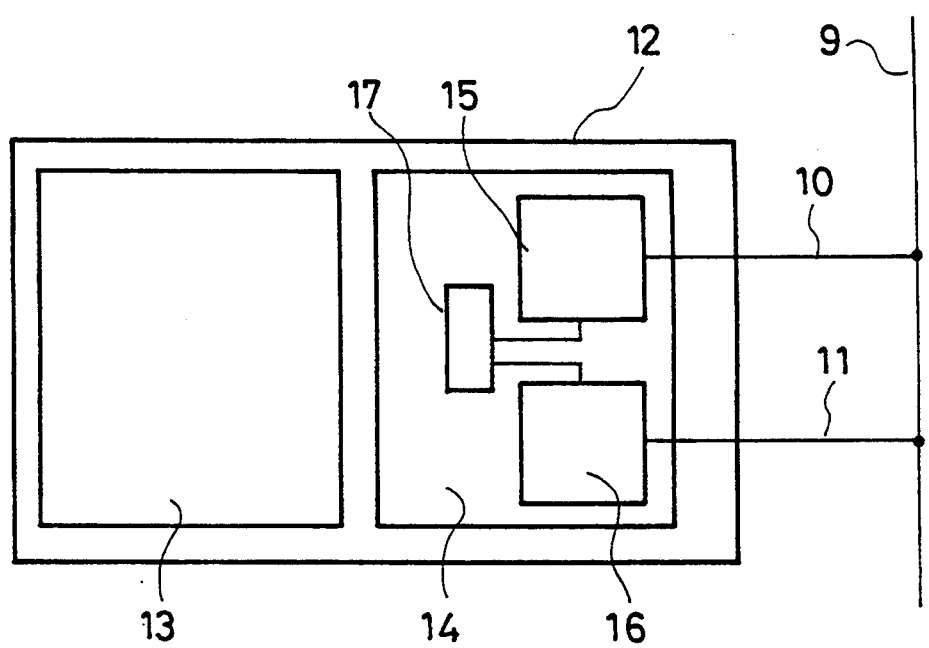
FIG. 10 is a block diagram showing one example of a conventional bus competitive control apparatus.

FIG. 3 shows a bus competitive control apparatus according to this invention where parts corresponding to those in FIG. 10 are indicated by the same references and the description thereof will be omitted. Here, the data communication format predetermined for the common data in the bus competitive control apparatus according to this invention is the same as the conventional format shown in FIG. 1. In addition, as well as the example illustrated in FIG. 2, in the above-mentioned common data communication format, a plurality of units 12a to 12d having communication control functions are coupled through transmission lines 10a to 10d and reception lines 11a to 11d to a common data circuit 9 so as to construct a communication system.

As illustrated in FIG. 3, each of the units 12a to 12d comprises a control section 13 and a communication control section 14. Further, the communication control section 14 comprises a transmission section 15 for performing the transmission control to the common data circuit 9, a reception section 16 for performing the reception control from the common data circuit 9, a collision detection section 17 for effecting the collision detection in the bus competitive control mode, a sequence control section 34 for constituting a speed setting means 34A to control the frame sequence, and a transmission rate control section 35 for receiving a control signal from the sequence control section 34 to control the transmission speed.

Figure 5:
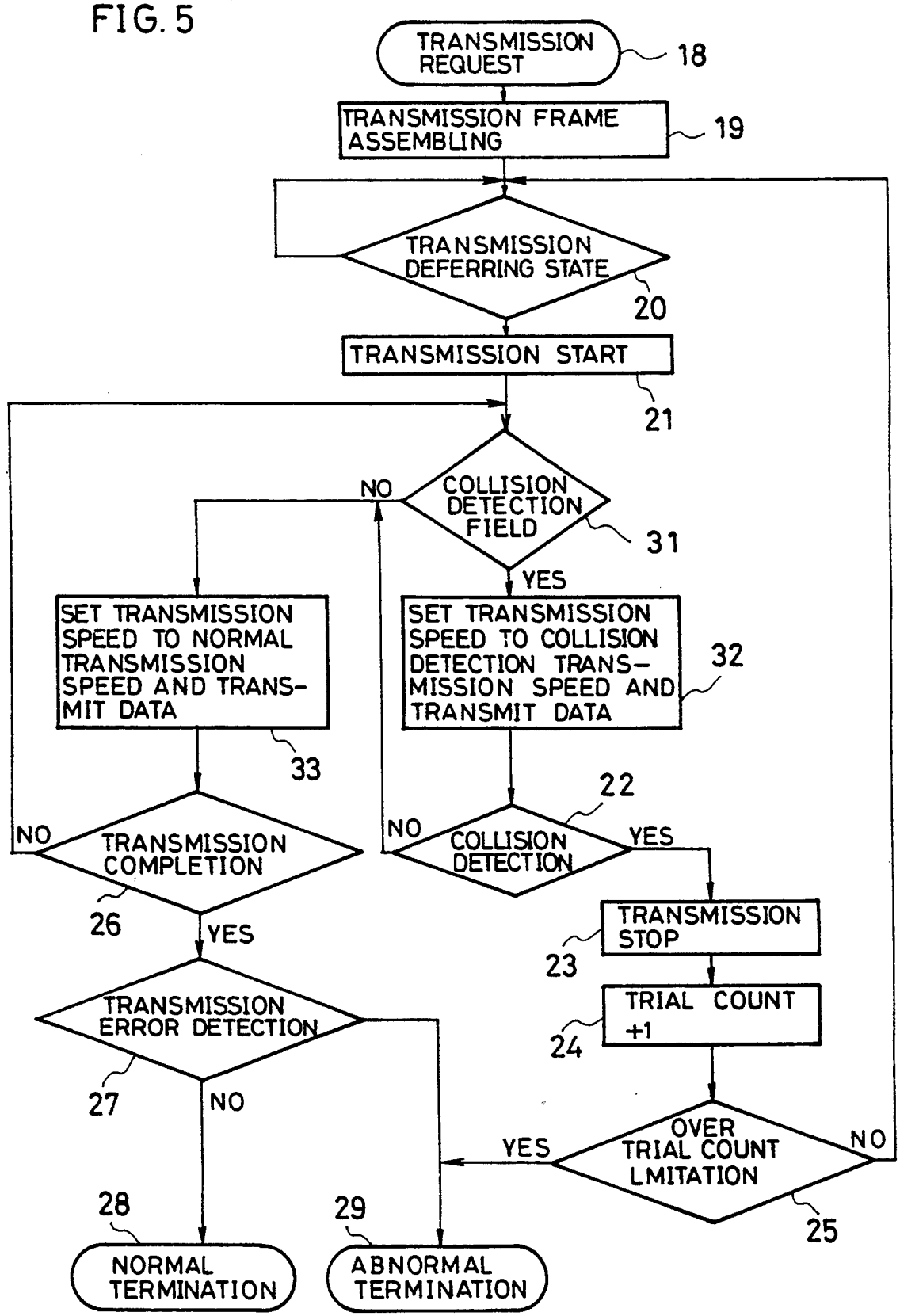
FIG. 5 is a flow chart showing a data transmission in an bus competitive control apparatus according to an embodiment of this invention.

Secondly, a description will be made in terms of the collision detection operation according to the bus competitive control mode in the communication system of the bus competitive control apparatus according to the first embodiment of this invention. Here, assuming that the A unit 12a and B unit 12b in FIG. 2 generate the transmission requests, the collision detection operation in the bus competitive control mode will be described with reference to the data transmission flow chart illustrated in FIG. 5. In FIG. 5, prior to the communication, the A unit 12a and B unit 12b, generating the transmission requests (step 18 ), respectively performs a transmission frame assembling (step 19) process in FIG. 5 in accordance with the data communication format illustrated in FIG. 1. Then, the A unit 12a and B unit 12b observe the transmission and reception states between the other units on the common data circuit 9 and detects the completion of the transmission and reception of the data between the other units on the basis of a communication completion signal of the communication data termination area 6 on the data communication format shown in FIG. 1, thereby advancing from a transmission deferring state decision (step 20) to a transmission start (step 21). The above-described operation performs the phase setting at the transmission start of the A unit 12a and B unit 12b.

A step 31 in FIG. 5 checks and decides the collision detection field. The signal initially transmitted in this embodiment is the transmission start signal area 1 of the FIG. 1 data communication format to be the non-collision field, and hence a decision is made such that it is not the collision detection field, whereby in a step 33 the data transmission is made at the normal transmission speed.

Further, after the transmission of the above-mentioned transmission start signal area 1, a decision is made in terms of whether the transmission completion (step 26) in FIG. 5 is made or not. When the decision shows no transmission completion, the step 31 is again executed in order to check whether it is the collision detection field. The next signal to be transmitted is the priority determining area 2 in FIG. 1 to decide the collision detection area, and hence in a step 32 the transmission speed is set to the collision detection transmission speed and the data transmitting operation is effected. Here, on the assumption that on this communication system the A unit 12a is set to be higher in priority than the B unit 12b, a description will be made hereinbelow in terms of the operation of the A unit 12a having the higher priority. The A unit 12a, which is in the data transmission state of the priority determining area 2 in FIG. 6 at the collision detection transmission speed, transmits the data at the normal transmission speed (step 33) in the case that the result of the collision detection (step 22) in FIG. 5 shows that the priority signal itself is not in the collision state, and performs the transmission of the remaining non-collision-detected area of the transmission frame in FIG. 6 and the transmissions of the communication control area 3, communication data area 4, communication data termination area 5 and transmission completion signal area 6 and advances through the transmission completion step 26 routine to a transmission error detection (step 27) in FIG. 5. If an error is detected, the A unit 12a proceeds to an abnormal termination (step 29), and if the error is not detected, the A unit 12a proceeds to a normal termination (step 28), thereafter completing the transmission.

Secondly, a description will be made in terms of the operation of the B unit 12b which is set to be lower in priority than the A unit 12a. The B unit 12b, which enters into the data transmission operation of the priority determining area 2 in FIG. 6 at the collision detection transmission speed, performs the collision detection (step 22) in FIG. 5. When detecting that its own priority signal is lower than the priority signal generated by the other unit, the B unit 12b effects a transmission stopping (step 23) operation and increases the transmission trial count by 1 (step 24) to check whether the trial count exceeds a trial count limitation (step 25). If not exceeding the trial count limitation, the B unit 12b shifts to again execute the transmission deferring state decision (step 20) process. On the other hand, if exceeding the trial count limitation, the B unit 12b shifts to the abnormal termination (step 29).

Figure 4:
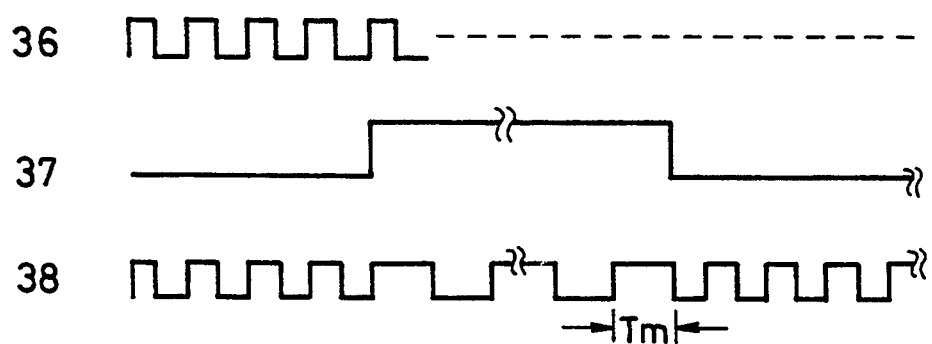
FIG. 4 is a waveform diagram showing clocks and a signal in a bus competitive control apparatus according to an embodiment of this invention.

Further, a description will be made with reference to FIG. 4 in terms of the operations of the plurality of units coupled to the common data circuit 9. In the illustration, numeral 37 is a control signal outputted from the sequence control section 34 for controlling the transmission sequence to input the collision field to the next step's transmission rate control section 35. In response to the control signal 37, the transmission rate control section 35 controls the clocks of the transmission section 15 and reception section 16 to respectively control the clocks of the aforementioned transmission section 15 and reception section 16 for the collision detection field 2 and the non-collision detection field 30. According to this operation, it is possible to respectively set the transmission speeds for the collision detection field 2 and non-collision detection field 30 of the transmission frame on the common data circuit 9. That is, when the control signal 37 takes the H level, while taking the H level state, the period of the speed-setting basic clock 38 becomes Tm to generate a wider pulse whereby the transmission speed is set to be low (second embodiment). Here, a variable means 34m is provided so that the above-mentioned period Tm is variable to change the transmission speed to allow the adjustment of the transmission speed in accordance with the load resistance, load capacity and others (third embodiment). In addition, in the reception section 16 there is provided a demodulator 16a whose operating speed is also controlled in accordance with the speed-setting basic clock 38. Since the operating speed is set to be lower as compared with the normal state when receiving the collision detection field 2, it is possible to surely perform the reception operation (fourth embodiment).

Figure 7A:
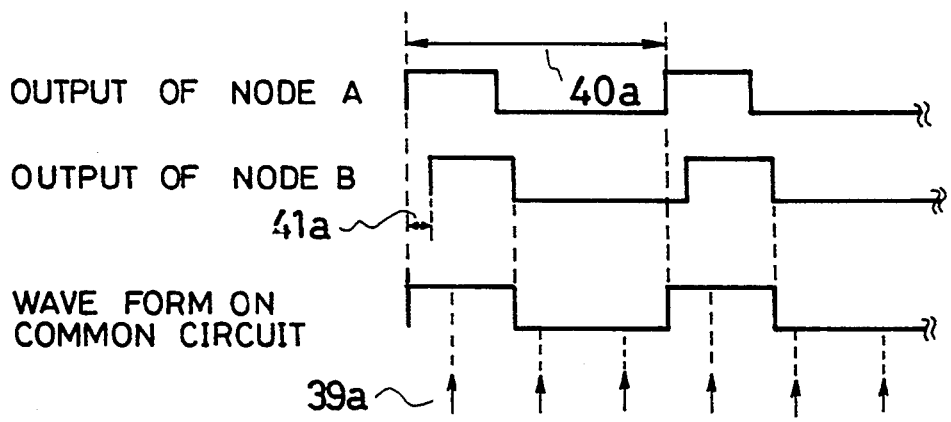
FIGS. 7A, 7B, and 7C are an illustration for describing a collision detection and a transmission speed in a bus competitive control apparatus according to an embodiment of this invention.
Figure 7B:
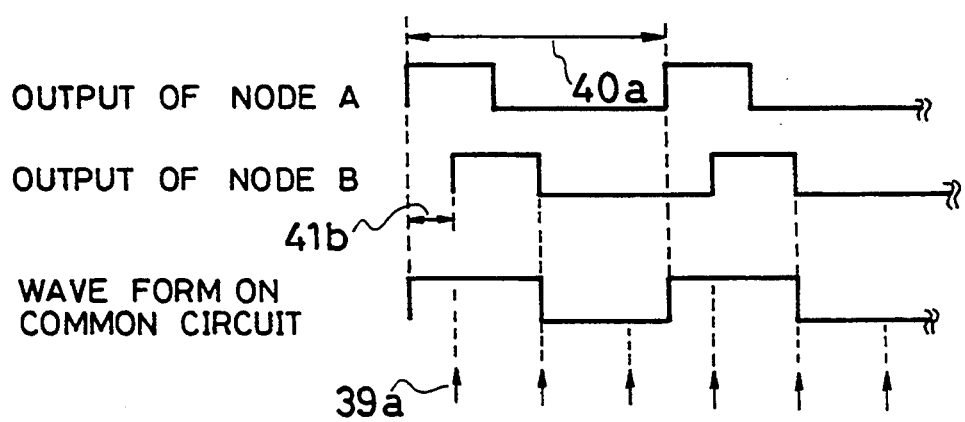
Figure 7C:
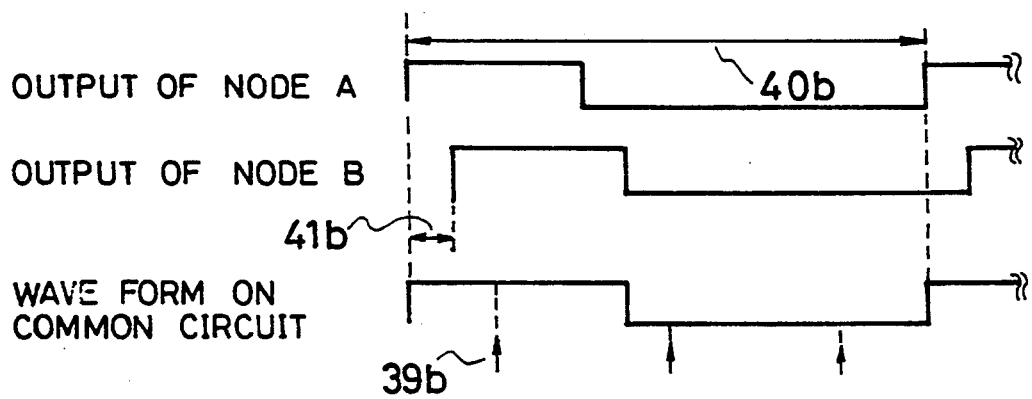

Moreover, a description will be made in terms of the transmission speed of the collision detection field 2 and the transmission speed of the non-collision detection field 30. First, the transmission speed of the collision detection field 2 will be described with reference to FIG. 7. Let it be assumed that as shown by (a) in FIG. 7 the output of a node B is apparently delayed by 41a with respect to the output of a node A due to the load resistance and load capacity on the common data circuit. In this case, although the decision between the High and Low (which will be referred to as H and L) of the data can be made on the basis of a sampling point 39a, in the case that as illustrated by (b) in FIG. 7 the out-put of the node B relative to the output of the node A is affected by the aforementioned delay so that an apparent delay 41b occurs, it becomes impossible to make the decision between H and L on the basis of the sampling point 39a so as to make impossible the collision detection at a transmission speed 40a. Further, even if the above-mentioned common data circuit 9 has the same delay 41b, in the case that the transmission speed is set to a transmission speed 40 lower than the transmission speed 40a as illustrated by (c) in FIG. 7, the decision between H and L can be made on the basis of a sampling point 39b, thereby allowing the collision detection. Thus, with the transmission speed for the collision detection field being lowered, it is possible to accurately detect the collision.

Figure 8A:
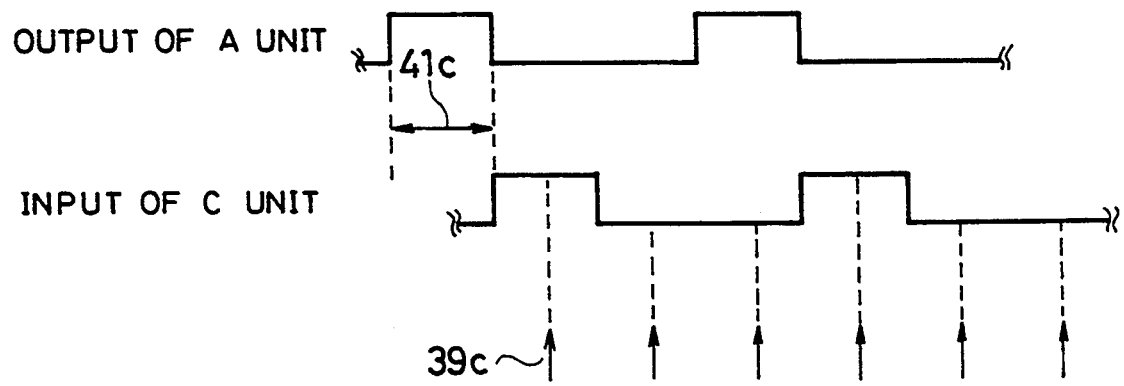
FIGS. 8A and 8B are an illustration for describing a transmission speed in a non-collision detection field in a bus competitive control apparatus according to an embodiment of this invention.
Figure 8B:
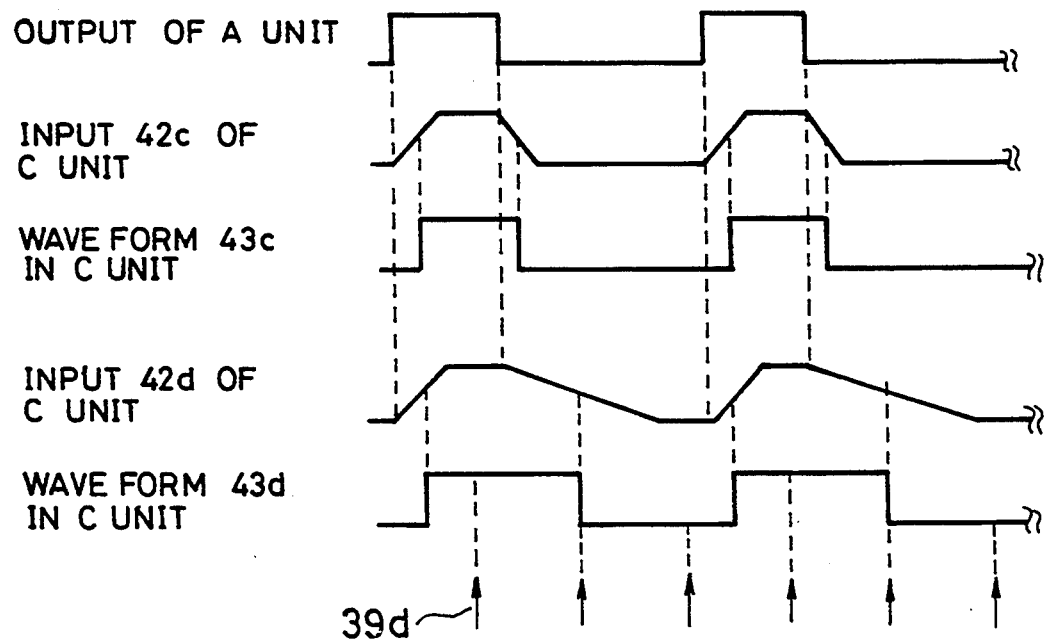
Figure 9:
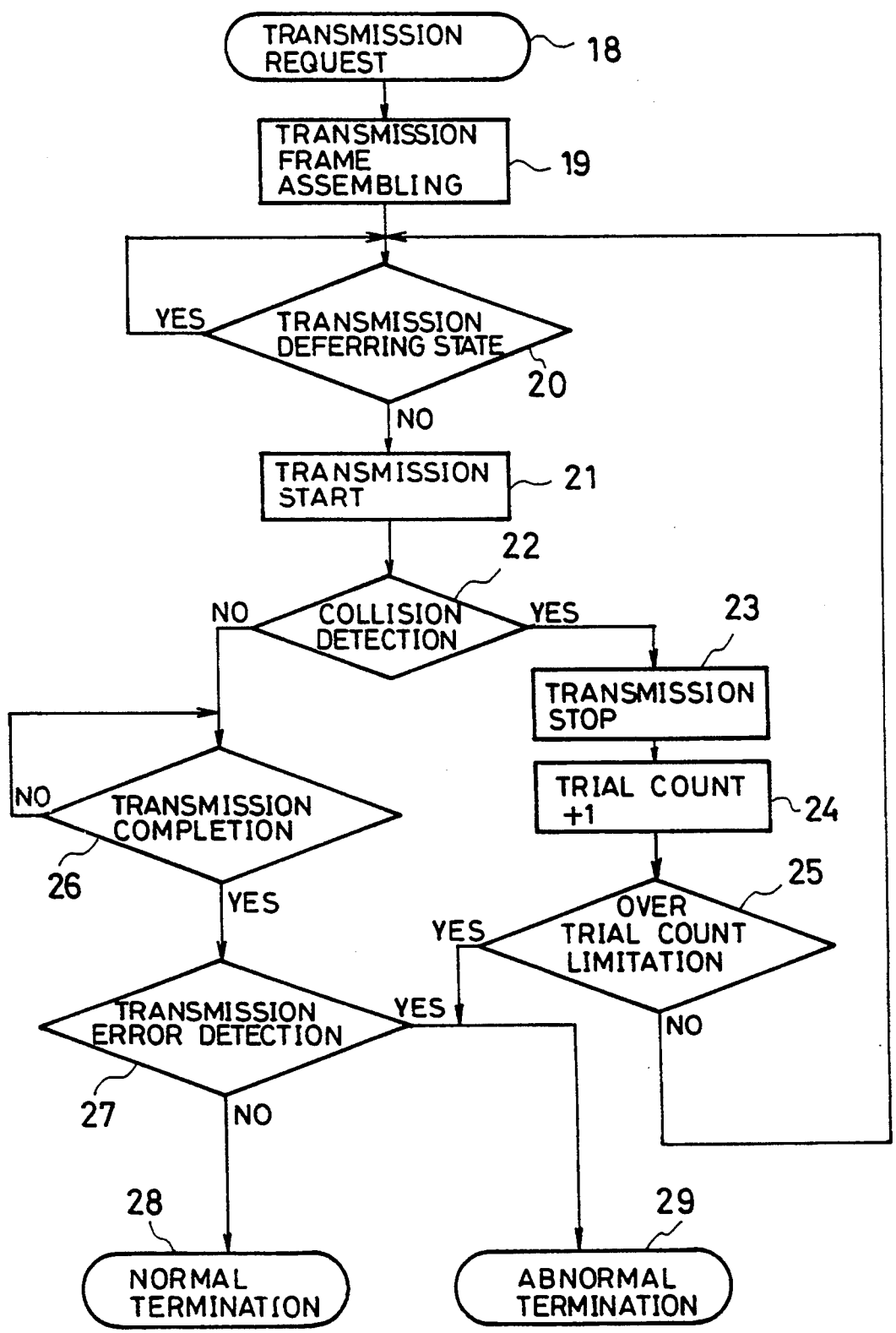
FIG. 9 is a data transmission flow chart showing one example of conventional bus competitive control apparatus.

In addition, a description will be made with reference to FIG. 8 in terms of the transmission speed for the non-collision detection field 30. In the case that as illustrated by (a) in FIG. 8 the data outputted from the A unit 12a results in the occurrence of a delay 41c in the waveform to be inputted to the reception-target (destination) C unit 12c due to the delay of the above-mentioned data circuit 9, a node C side can make the decision between H and L on the basis of a sampling point 39c, thereby allowing the normal reception. That is, if the delay occurs so that the H interval is relatively equal to the L interval, the transmission and reception of the non-collision detection field can be effected at the highest transmission speed allowed by the unit. Further, in the case that as shown by (b) in FIG. 8 the delays at the rising and falling times are different from each other, when the input of the C unit 12c which is at the reception side has a waveform like the waveform of the input 42c of the C unit 12c shown in (b) of FIG. 8, the waveshaped reception waveform in the reception section 16 of the C unit 12c shows a waveform like the waveform 43c in the C unit 12c. Although the decision between H and L can be made at a sampling point 39d, in the case that the input of the C unit 12c is affected by the delay like the input 42d of the C unit 12c shown in (b) of FIG. 8, the waveshaped reception waveform in the reception section 16 of the C unit 12c becomes like a waveform 43d in the C unit 12c and the decision between H and L becomes impossible at the sampling point 39d, thereby making difficult the normal reception. In this case, the transmission speed is required to be set so as to allow this delay.

According to the above-described method, at the transmission speed of the collision detection field 2 and the non-collision detection field 30 respectively set through the above-described processes, the transmission and reception operations of the data are effected in the bus competitive control apparatus. Here, the FIGS. 7 and 8 signal waveforms described in the first embodiment are PWM waveforms pulse-width-modulated and the sampling is effected 3 times per 1 bit.

Although in the first embodiment the collision detection field is executed as the priority determining area 2 in FIG. 2, it is appropriate that the collision detection field is provided at any portions within one frame or the execution is made at a plurality of areas. Further, although in the first embodiment the transmission data is pulse-width-modulated, it is also appropriate that the transmission data is processed in a different modulating method. In addition, it is appropriate that an automatic setting means for automatically setting the speed is incorporated at the initial system-constructing time or at every predetermined time interval. In detail, with the normal speed (the transmission speed for the non-collision detection field) being set as the origin, the delay is gradually enlarged up to the allowable speed so that this allowable speed is set to the delay speed. If this operation is effected through an operation of a timer at the time of the system completion and at every predetermined interval, it is possible to allow the follow-up with respect to the load resistance and load capacity. Here, it is appropriate that in place of the illustrated variable resistor the variable means 34m is arranged, for example, such that a plurality of dividers are provided and a switching means such as a multiplexer to select one of the plurality of dividers is provided so as to obtain a predetermined period on the basis of the control signal from the control section.

According to the first embodiment, the speed setting means is provided which sets the transmission speed of the collision detection field to the common data circuit to the system-allowable speed lower as compared with the non-collision detection field so that the transmission speed of the collision detection field is set to a transmission speed whereby the delay of the communication data due to the load resistance and the load capacity of the common data circuit does not give the influence on the collision detection, and hence it is possible that the it is set to become low to reach the system-allowable speed and it is possible to reduce the influence of the delay of the communication data due to the common data circuit on the collision detection, thereby allowing an accurate detection of the collision.

According to the second embodiment, since the speed setting basic clock for setting the speeds of the data of the collision detection field and the non-collision detection field on the basis of the period is provided as the speed setting means and the sequence control section is provided which sets the period of the clock to become longer at every detection of the collision detection field to lower the transmission speed, it is possible that the transmission speed of the collision detection field is controlled on the basis of the speed setting basic clock so as to be lowered up to a transmission speed whereby the delay of the communication data on the common data circuit does not affect the collision detection and the transmission speed of the non-collision detection field is lowered up to a transmission speed which does not affect the transmission and reception of the communication data so as to realize an accurate transmission and reception. In addition, even in the case that the above-mentioned delay occurs at the time of the transmission and reception of the non-collision detection field, the transmission and reception can be effected at the highest transmission speed in a range which allows the accurate transmission and reception, and the time necessary for the transmission and reception of the transmission frame, produced on the basis of the common data communication format, between the respective units is the sum of the transmission time of the collision detection field and the transmission field of the non-collision detection field, thereby shortening the time necessary for the transmission and reception.

According to the third embodiment, since the speed setting means is equipped with the variable means which can relatively vary the transmission speed of the collision detection field with respect to the transmission speed of the non-collision detection field, the transmission speeds of the collision detection field and non-collision detection field can be adjusted in accordance with the actual delay amount.

According to the fourth embodiment, since each of the units is equipped with the reception section comprising the demodulator for receiving and demodulating the data on the common data circuit and the operating speed of the demodulator is controlled on the basis of the output of the speed setting means so that the speed at the reception time of the collision detection field is lower than the speed at the reception time of the non-collision detection field, it is possible to accurately perform the reception to heighten the collision detection accuracy.

What is claimed is:

1. A bus competitive control apparatus comprising:

a control module unit connected to a common data circuit, said unit employing a common data communication format to communicate over said common data circuit, wherein a frame according to said common data communication format includes a collision detection field including a priority determining area for transmitting a priority signal indicative of a priority of said unit, receiving priority signals for other units connected to said common data circuit, and comparing the signals with the transmitted priority signal for said unit and a non-collision detection field including a data communication area, and said unit including a collision detection section for comparing said priority signal of said control module unit with a priority signal obtained from a priority determining area of a collision detection field received over said common data circuit from another control module unit so as to compare priority between itself and said another control module unit and upon a determination of higher priority, enabling output of the non-collision detection field; and speed setting means included within said control module unit for lowering a transmission speed of the collision detection field to a system-allowable speed that is lower than a transmission speed used for said non-collision detection field so as to extend the priority comparison area and secure the detection of a collision.

2. A bus competitive control apparatus as claimed in claim 1, wherein said speed setting means is equipped with a speed setting basic clock for generating a clock signal to set data transmission speeds of said collision detection field and said non-collision detection field said clock signal having a period adjusted responsive to a period length control signal and further equipped with a sequence control section for controlling said period length control signal to lengthen said period of said clock upon detection of said collision detection field so as to lower the transmission speed.

3. A bus competitive control apparatus as claimed in claim 1, wherein said speed setting means is equipped with variable means for relatively varying said transmission speed of said collision detection field relative to said transmission speed of said non-collision detection field.

4. A bus competitive control apparatus as claimed in claim 1, wherein said unit is equipped with a reception section comprising a demodulator for receiving and demodulating data on said common data circuit, and an operating speed of said demodulator is controlled responsive to an output of said speed setting means so that the reception speed during said collision detection field is set to be lower than the reception speed during said non-collision detection field.

* * * * *